US012674856B2

(12) United States Patent
    Fakoorian et al.

(10) Patent No.: US 12,674,856 B2
(45) Date of Patent: Jul. 7, 2026

(54) CONFIGURATION OF SIDELINK POSITIONING REFERENCE SIGNALS

(71) Applicant: Apple Inc., Cupertino, CA (US)

(72) Inventors: Seyed Ali Akbar Fakoorian, San Diego, CA (US); Wanping Zhang, San Jose, CA (US); Chunxuan Ye, San Diego, CA (US); Dawei Zhang, Saratoga, CA (US); Faraz Faheem, Santa Clara, CA (US); Haitong Sun, Cupertino, CA (US); Jie Cui, San Jose, CA (US); Kirk Burroughs, Alamo, CA (US); Sachin J. Sane, San Jose, CA (US); Sooyoung Lee, Santa Clara, CA (US); Wei Zeng, Saratoga, CA (US); Weidong Yang, San Diego, CA (US); Yang Tang, San Jose, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 501 days.

(21) Appl. No.: 17/822,310

(22) Filed: Aug. 25, 2022

(65) Prior Publication Data

US 2023/0066384 A1     Mar. 2, 2023

Related U.S. Application Data

(60) Provisional application No. 63/260,862, filed on Sep. 2, 2021.

(51) Int. Cl.
    H04W 72/20     (2023.01)
    G01S 5/00     (2006.01)
    H04L 5/00     (2006.01)

(52) U.S. Cl.
    CPC .......... G01S 5/0072 (2013.01); H04L 5/0051 (2013.01); H04W 72/20 (2023.01)

(58) Field of Classification Search
    CPC .......................... H04L 25/0226; H04W 64/00; H04W 64/006; H04W 24/10; H04W 64/003; H04W 4/029; H04W 16/14; H04B 17/27
    See application file for complete search history.

(56) References Cited

U.S. PATENT DOCUMENTS

2019/0230618 A1     7/2019     Saur et al.
2019/0297673 A1     9/2019     Xue et al.
                    (Continued)

FOREIGN PATENT DOCUMENTS

CN          110036307 A      7/2019
EP          4084506         11/2022
                    (Continued)

OTHER PUBLICATIONS

3GPP, "3rd Generation Partnership Project; Technical Specification Group Radio Access Network; NR; User Equipment (UE) feature list (Release 16)"; 3GPP TR 38.822 V16.0.0., Jul. 9, 2021, 199 pages.

(Continued)

*Primary Examiner* — Yee F Law
(74) *Attorney, Agent, or Firm* — Fay Kaplun & Marcin, LLP

(57)     ABSTRACT

A user equipment (UE) configured to receive a sidelink (SL) positioning reference signal (PRS) resource configuration, wherein the SL-PRS resource configuration indicates one or more SL-PRS resources configured for one or more assisting UEs in a vicinity of the UE, transmit a reference signal (RS) positioning capability and measure SL-PRS transmitted from the one or more assisting UEs.

19 Claims, 8 Drawing Sheets

(56)  References Cited

U.S. PATENT DOCUMENTS

| | | | | |
|---|---|---|---|---|
| 2021/0136787 A1* | 5/2021 | Opshaug | ................. | A61F 5/005 |
| 2021/0152410 A1* | 5/2021 | Opshaug | ............... | H04W 24/10 |
| 2021/0185632 A1* | 6/2021 | Manolakos | ........... | H04L 5/0094 |
| 2021/0337531 A1* | 10/2021 | Manolakos | ........... | H04W 72/51 |
| 2021/0377906 A1* | 12/2021 | Bao | ....................... | H04W 24/10 |
| 2022/0377697 A1* | 11/2022 | Bi | ......................... | G01S 5/0036 |
| 2023/0296752 A1* | 9/2023 | Thomas | ............... | H04L 5/0048 |
| | | | | 342/125 |

FOREIGN PATENT DOCUMENTS

| | | | | |
|---|---|---|---|---|
| WO | 2021/051905 | 3/2021 | | |
| WO | 2021/092813 | 5/2021 | | |
| WO | 2021/129060 | 7/2021 | | |
| WO | WO-2022034483 A2 * | 2/2022 | ............ | H04W 92/18 |

OTHER PUBLICATIONS

Lenovo, "On Potential SL Positioning Solutions", 3GPP TSG RAN WG1#109-e, R1-2204559, Apr. 30, 2022, 17 sheets.

* cited by examiner gNB
120A

CONFIGURATION OF SIDELINK POSITIONING REFERENCE SIGNALS

PRIORITY/INCORPORATION BY REFERENCE

This application claims priority to U.S. Provisional Application Ser. No. 63/260,862 entitled "Configuration of Sidelink Positioning Reference Signals," filed on Sep. 2, 2021, the entirety of which is incorporated herein by reference.

BACKGROUND

When establishing the network connection such as, for example, a connection to a 5G new radio (NR) network, a user equipment's (UE) positioning information is communicated with the network using positioning reference signals (PRS) which the UE measures and reports back to the network to communicate the UE's position.

SUMMARY

Some exemplary embodiments are related to a processor of a user equipment (UE) configured to perform operations. The operations include receiving a sidelink (SL) positioning reference signal (PRS) resource configuration, wherein the SL-PRS resource configuration indicates one or more SL-PRS resources configured for one or more assisting UEs in a vicinity of the UE, transmitting a reference signal (RS) positioning capability and measuring SL-PRS transmitted from the one or more assisting UEs.

Other exemplary embodiments are related to a processor of a location assisting user equipment (UE) configured to perform operations. The operations include receiving a sidelink (SL) positioning reference signal (PRS) resource configuration, wherein the SL-PRS resource configuration indicates SL-PRS resources to be transmitted via a sidelink to a location assisted UE in a vicinity of the location assisting UE and transmitting SL-PRS to the location assisted UE based on the SL-PRS resource configuration.

Still further exemplary embodiments are related to a processor of a base station configured to perform operations. The operations include determining one or more assisting user equipments (UEs) that are proximate to a positioning UE and configuring the one or more assisting UEs with one or more sidelink (SL)-positioning reference signal (PRS) resources for transmission to the positioning UE, wherein the one or more SL-PRS resources are used to determine a location of the positioning UE.

DETAILED DESCRIPTION

Figure 1:
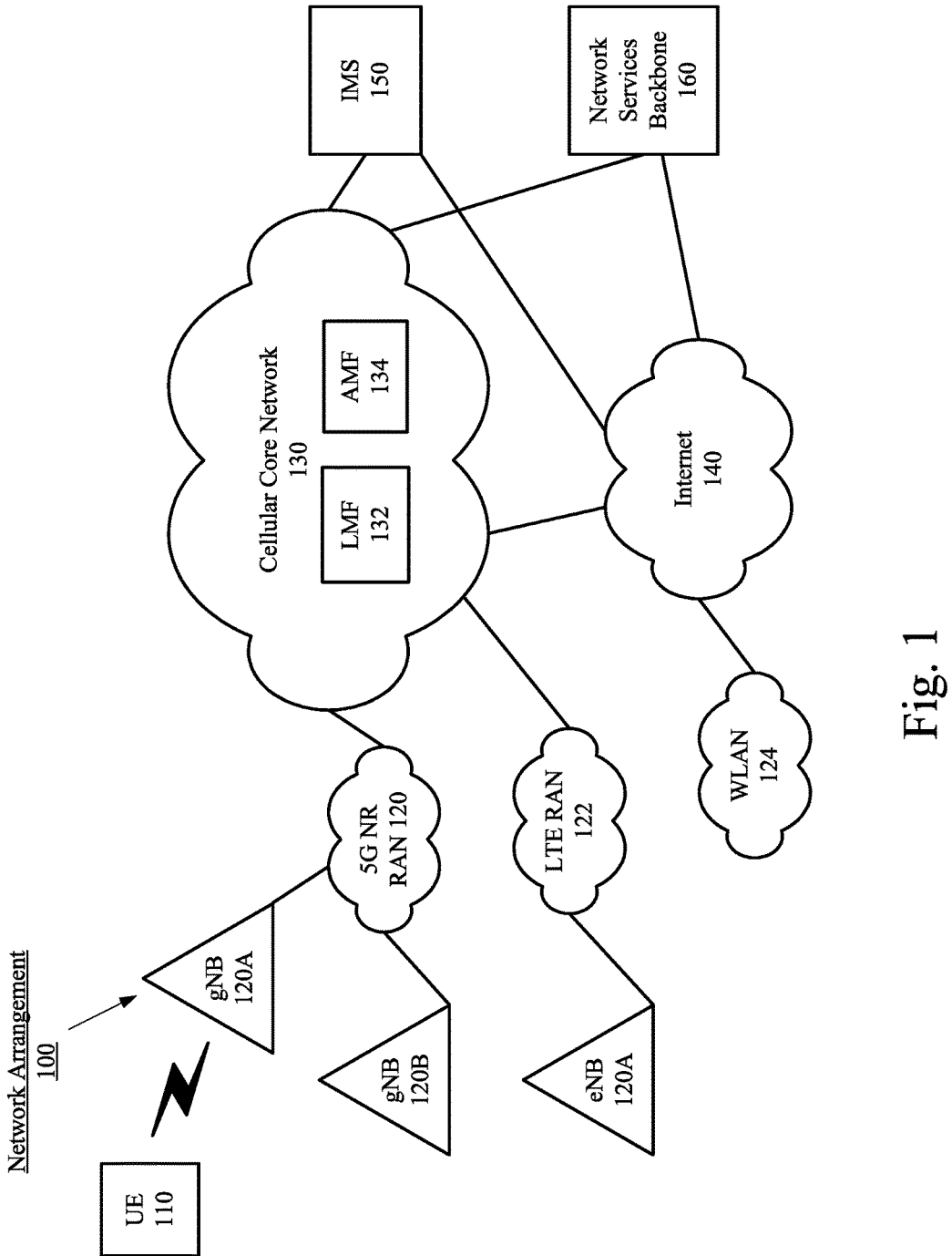
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to the configuration of sidelink positioning reference signals (PRS) to assist a user equipment (UE) in determining its location.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein.

When determining a UE's location, the UE is provided with positioning reference signals (PRS) from a transmission and reception point (TRP) of the 5G NR network (e.g., from a next generation nodeB (gNB)). The UE measures the resources of the PRS to determine its location. However, if the UE is not within network coverage or has a weak signal due to, for example, being inside of a building, the PRS from the TRP is weakened. Those skilled in the art will understand that there are various manners of determining UE position based on the measurement of the PRS from one or more TRPs. However, the specific manner of determining the position based on the PRS measurements is outside the scope of the present disclosure. The present disclosure is concerned with configuring the PRS for transmission by the TRPs and/or one or more neighboring assisting UEs.

According to some exemplary embodiments, a UE may perform a location assisted procedure (e.g., a location assisted UE). In this location assisted procedure, the UE is configured with sidelink (SL) PRS resources that will be transmitted to the UE from one or more neighboring assisting UEs. The UE will then measure the SL PRS resources. The exemplary embodiments may be applied to UE-based location where the UE then uses the measurements to determine its location or network-based location where the UE sends the measurement data to a network function (e.g., location management function) for determining the location of the UE.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. In this example, the components include a location management function (LMF) 132 and an access and mobility management function (AMF) 134. However, an actual cellular core network may include various other components performing any of a variety of different functions.

The LMF 132 performs operations related to positioning such as, but not limited to, configuring PRS signals for the UE 110 to determine and report its location to the cellular core network 130.

The AMF 134 performs operations related to mobility management such as, but not limited to, paging, non-access stratum (NAS) management and registration procedure management between the UE 110 and the cellular core network 130. Reference to a single AMF 134 is merely for illustrative purposes, an actual network arrangement may include any appropriate number of AMFs.

The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
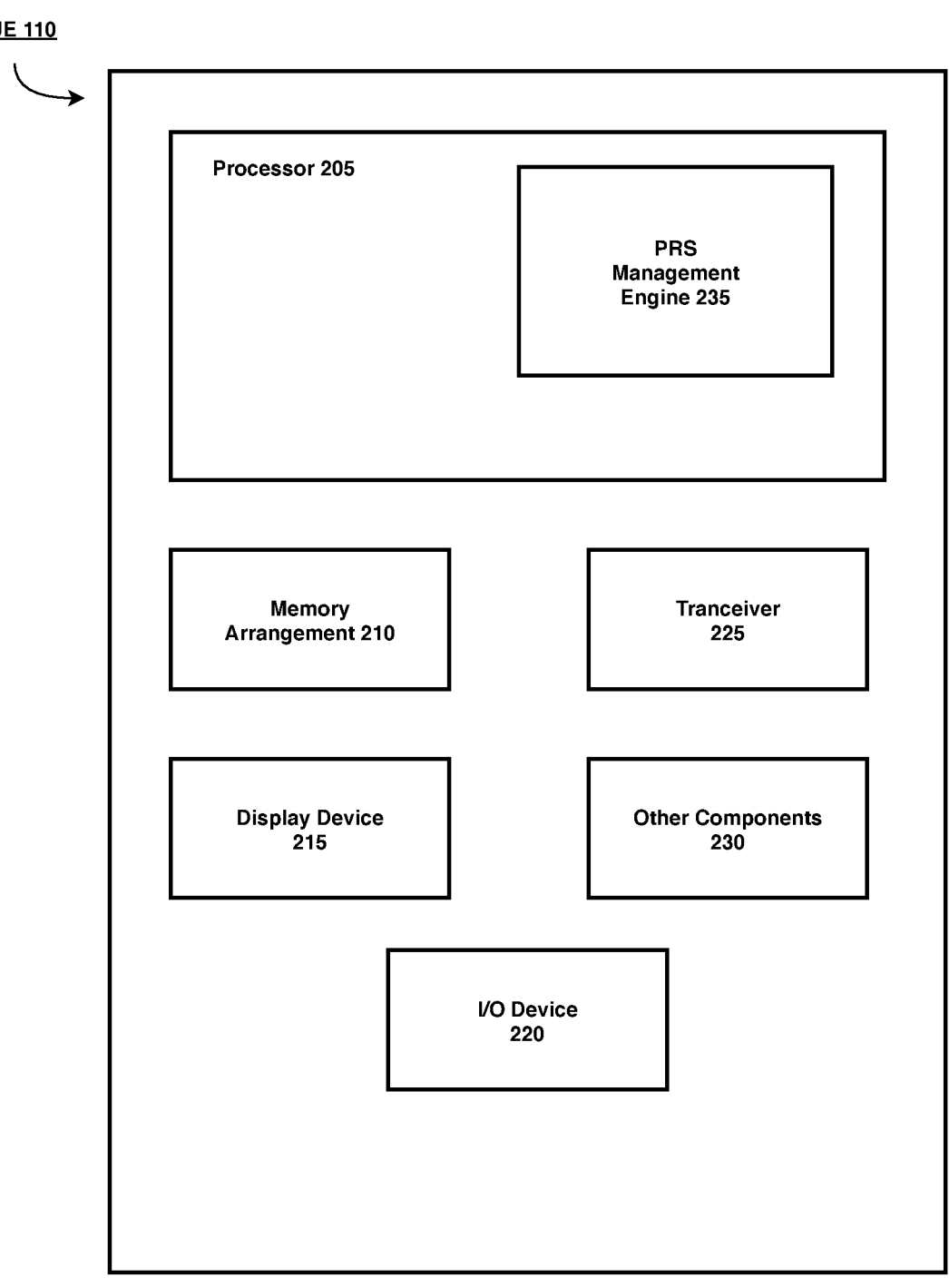
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a PRS management engine 235. The PRS management engine 235 may perform various operations related to receiving one or more PRS signals (e.g., a downlink (DL) PRS from the gNB 120A and a SL PRS from a neighboring assisting UE), performing measurements on those signals, and determining a location of the UE 110 based on those measurements, as will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
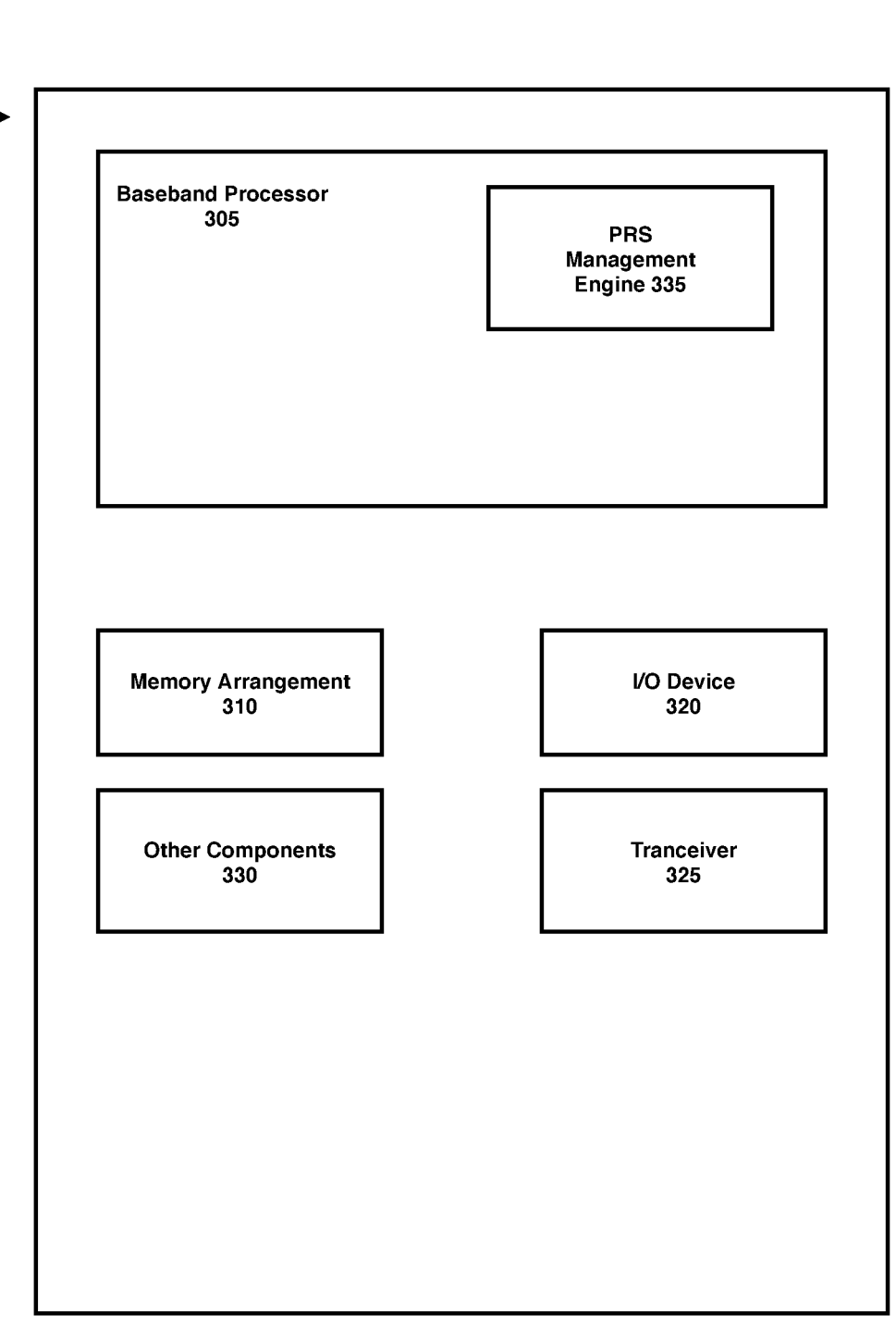
FIG. 3 shows an exemplary base station according to various exemplary embodiments.

FIG. 3 shows an exemplary network base station, in this case gNB 120A, according to various exemplary embodiments. The gNB 120A may represent any access node of the 5G NR network through which the UE 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a PRS management engine 335 for performing operations including configuring one or more PRS resources for measurement by a UE 110 to determine its location. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory arrangement 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the network arrangement 100. The transceiver 325 may operate on a variety of different frequencies or channels (e.g., set of consecutive frequencies). Therefore, the transceiver 325 may include one or more components (e.g., radios) to enable the data exchange with the various networks and UEs.

FIGS. 4A-D show exemplary signaling diagrams illustrating methods of configuring a positioning reference signal (PRS) for a UE according to various exemplary embodiments. As illustrated in FIGS. 4A-4D, sidelink PRS resources are transmitted from one or more neighboring assisting UEs 404a . . . n to the UE over a sidelink communication protocol to assist the UE 110 in determining its location. The assisting UEs 404a . . . n may be any type of UEs such as, for example, the UE types mentioned above with regards to UE 110, a roadside unit (RSU), or any other type of UE capable of establishing a sidelink with the UE 110.

Figure 4A:
FIGS. 4A-D show exemplary signaling diagrams illustrating methods of configuring a positioning reference signal (PRS) for a UE according to various exemplary embodiments.

FIG. 4A depicts a signaling diagram 400 for a scenario in which both the UE 110 and one or more assisting UEs 404a . . . n are within network coverage. That is, both the UE 110 and one or more assisting UEs 404a . . . n are within the range of a transmission and reception point (TRP) (e.g., gNB 120A) of the network 120. At 402, the LMF 132 configures DL-PRS resources (or resource sets) for the UE 110 as part of location assistance data. In other embodiments, the DL-PRS configuration may be provided by a positioning system information block (SIB). The DL-PRS configuration may include parameters such as, for example, a starting physical resource block (PRB), comb size, slot offset, symbol offset, number of symbols, periodicity, number of repetitions, etc.

At 405, the gNB 120A configures the assisting UEs 404a . . . n with SL-PRS resources or resource sets that will be used by the UE 110 to determine its position. In some embodiments, the SL-PRS may be configured on the same PositioningFrequencyLayer (PFL) as the DL-PRS. That is, the SL-PRS resources (or resource sets) may have the same subcarrier spacing (SCS), cyclic prefix (CP), and/or DL-PRS-PointA as those of the DL-PRS. DL-PRS-PointA defines the absolute frequency of a reference resource block. Its lowest subcarrier is referred to as Point A. All DL PRS resources belonging to the same DL PRS resource set have common Point A and all DL PRS resources sets belonging to the same DL-PRS PFL have a common Point A. In these embodiments, the UE 110 may process the SL-PRS in the same manner that it would the DL-PRS. In some embodiments the SL-PRS may have the same DL-PRS-PointA as the DL-PRS but different SCS and CP, depending on the capabilities of the assisting UEs 404a . . . n. In some embodiments, the SL-PRS the SL-PRS may be configured on a different PFL (non-overlapping or overlapping in frequency) than the DL-PRS.

In some embodiments, the SL-PRS may be configured to be quasi co-located (spatially related) with the SL-SSB, the SL Physical Sidelink Control Channel (PSCCH), the SL-channel state information (CSI)-RS, or the SL-Physical Sidelink Shared Channel (PSSCH) of the assisting UE 404a . . . n. As such, if the UE 110 receives, for example, an SL-PSSCH from one of the assisting UEs 404a . . . n, then the UE 110 may be configured to receive the SL-PRS on the same beam that it received the SL-PSSCH. In some embodiments, the SL-PRS may be configured to be quasi co-located with the DL-PRS, a DL-SSB, or a DL-CSI-RS received by the assisting UEs 404a . . . n or with an SRS transmitted by the assisting UEs 404a . . . n. The spatial relation of the SL-PRS with some other transmission is configured to avoid interference of the SL-PRS transmission with transmissions of other UEs (not shown) in the coverage area of the gNB 120A.

In some embodiments, the SL-PRS configuration may be performed via radio resource control (RRC) signaling. In some embodiments, the SL-PRS configuration may be cell specific (e.g., indicated by a positioning system information block (PosSIB)). In some embodiments, the SL-PRS may be similar to the DL-PRS or a positioning sounding reference signal (PosSRS) with respect to parameters such as, for example, slot offset, starting PRB, etc. In some embodiments, the SL-PRS may be different than the DL-PRS or PosSRS and have some or entirely different parameters. In some embodiments, the SL-PRS configuration may include multiple SL-PRS resource (or resource set) configurations. In such an embodiment, the gNB 120A may later trigger a specific one of the multiple resources (or resource sets) via a medium access control (MAC)-control element (CE) or downlink control information (DCI). The MAC-CE/DCI may also indicate a duration for which the assisting UE 404a . . . *n* should transmit the activated SL-PRS. In some embodiments, the MAC-CE/DCI may be specific to one of the assisting UEs 404a . . . *n*. In some embodiments, a group message (e.g., group common DCI) may be used. In such an embodiment, the group message may indicate which one(s) of the assisting UEs 404a . . . *n* should transmit the SL-PRS and which SL-PRS resource(s) should be transmitted.

At 406, the gNB 120A indicates to the UE 110 the configured SL-PRS resources (resource sets). In some embodiments, this indication may be provided to the UE 110 by the LMF 132 in the same manner as the DL-PRS at 402. In either scenario, the indication may include various details about the assisting UEs 404a . . . *n*. For example, the indication may include the UE ID corresponding to each of the assisting UEs 404a . . . *n* associated with each SL-PRS, the timing relative to the PRS received from the gNB 120a (or a reference assisting UE 404a . . . *n*) and a PRS received from an assisting UE 404 . . . *n*, the SL-PRS configuration of candidate assisting UEs 404a . . . *n*, spatial direction information (e.g. azimuth, elevation, etc.) of the SL-PRS resources configured for the assisting UEs 404a . . . *n*, the SL-SSB information of the assisting UEs 404a . . . *n*, and geographical coordinates (absolute or relative to the gNB 120A or reference assisting UE) of the assisting UEs 404a . . . *n*.

At 408, the UE 110 reports its RS reception capability to the gNB 120A. At 410, the UE 110 may also additionally or alternatively report this capability to the assisting UEs 404a . . . *n*. The capability indication includes parameters (N,T), where N indicates that within N milliseconds (ms) of a PRS reception, the UE 110 uses T ms to receive and process the PRS. For example, for a 6 ms PRS reception, if the UE 110 uses an additional 2 ms to process the PRS, then the parameters would be (6,8). In other words, N is a duration of DL PRS symbols in ms processed every T ms for a given maximum bandwidth (e.g., in MHz supported by UE 110). In some embodiments, these capability parameters may be the same for DL-PRS (uu interface) and SL-PRS (PC5 interface). In some embodiments, the capability numbers may be different for DL-PRS and SL-PRS on different PFLs, component carriers (CCs), or bandwidth parts (BWPs). In some embodiments, the capability numbers may be different for DL-PRS and SL-PRS on the same CC or active BWP.

At 412, one or more of the assisting UEs 404a . . . *n* transmits the SL-PRS to the UE 110. In some embodiments, the SL-PRS can be in the form of the PosSRS. In such an embodiment, the UE 110 will expect to receive the DL-PRS from the gNB 120A and the PosSRS from the assisting UEs 404a . . . *n* in a time division multiplexed (TDM) manner (depending on UE capability). In some embodiments, the SL-PRS can be in the form of the DL-PRS. In such an embodiment, the UE 110 will expect to receive the DL-PRS from both the gNB 120A and the assisting UEs 404a . . . *n* in the same DL slots/symbols (depending on UE capability).

At 414, the UE 110 determines its location based on the measurement of the SL-PRS parameters received from the assisting UEs 404a . . . *n*. Those skilled in the art will understand that in some cases, the UE 110 may transmit the PRS measurements to a network component/function (e.g., the LMF 132) to perform the actual location calculations.

Figure 4B:

FIG. 4B depicts a signaling diagram 420 for a scenario in which the UE 110 is within network coverage and the one or more assisting UEs 404a . . . *n* are outside of network coverage. At 422, the LMF 132 configures DL-PRS resources (or resource sets) for the UE 110 similar to 402 described above with respect to the signaling diagram 400. Because the assisting UEs 404a . . . *n* are outside of network coverage (outside of the coverage of gNB 120A), the assisting UEs 404a . . . *n* are preconfigured with the SL-PRS resources (resource sets) at 424. In some embodiments, the SL-PRS preconfiguration indicates SL-PRS parameters such as, for example, the starting PRB, the comb size, slot and symbol offset, number of symbols, periodicity, number of repetitions, etc.

At 426, the gNB 120A indicates to the UE 110 the configured SL-PRS resources (resource sets) similar to that discussed above at 406 for signaling diagram 400. At 428, the UE 110 reports its RS reception capability to the gNB 120A in a manner similar to 408 discussed above. At 430, the UE 110 may also additionally or alternatively report this capability to the assisting UEs 404a . . . *n* in a manner similar to 410 discussed above.

At 432, one or more of the assisting UEs 404a . . . *n* transmits the SL-PRS to the UE 110. Because the assisting UEs 404a . . . *n* are outside of network coverage, they are not managed by the gNB 120A. As such, in some embodiments, an assisting UE 404a . . . *n* may activate one (or some) of the preconfigured SL-PRS resources randomly to avoid possibly selecting the same SL-PRS resource. In some embodiments, an assisting UE 404a . . . *n* may alternatively activate one (or some) of the preconfigured SL-PRS resources based on an SL-Service Set Identifier (SL-SSID) of the assisting UE 404a . . . *n* or based on some trigger or request received from the UE 110. As a result, possible interference caused by more than one of the assisting UEs 404a . . . *n* selecting the same SL-PRS resource is avoided.

At 434, the UE 110 determines its location based on the measurement of the SL-PRS parameters received from the assisting UEs 404a . . . *n*.

Figure 4C:
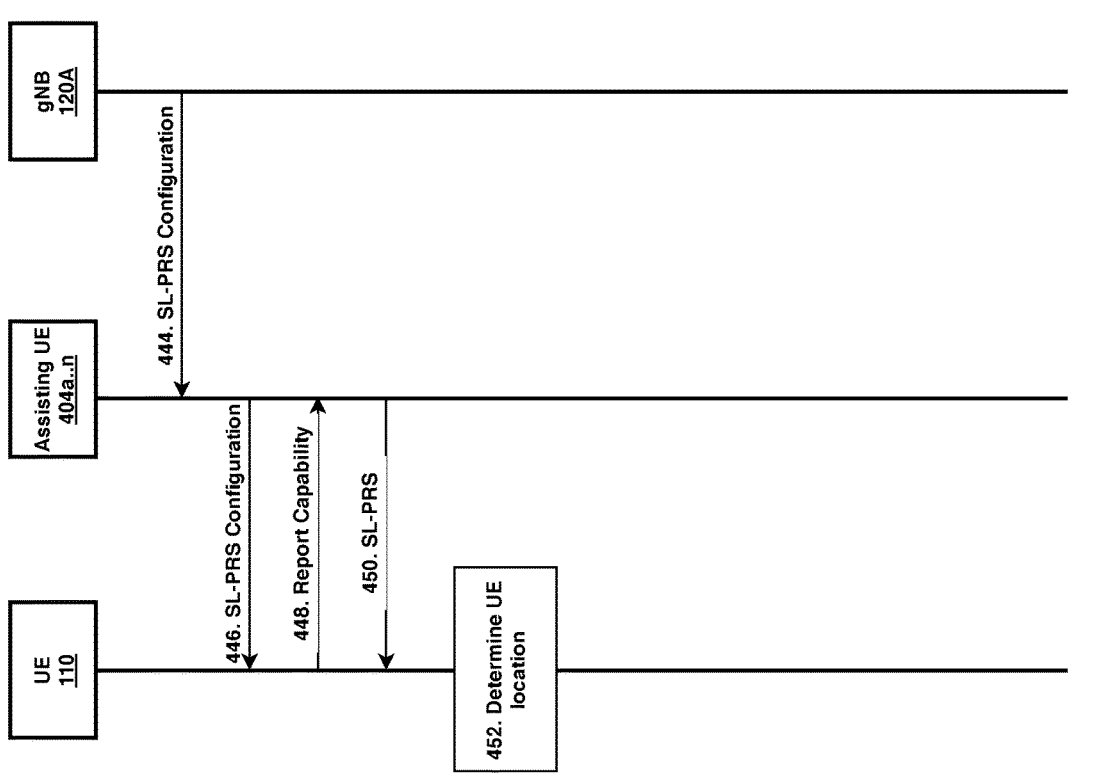

FIG. 4C depicts a signaling diagram 440 for a scenario in which the UE 110 is outside of network coverage and the one or more assisting UEs 404a . . . *n* are within network coverage. In such a scenario, the UE 110 may have been preconfigured with the SL-PRS resources when it was within network coverage or it may be configured with the SL-PRS resources by the assisting UEs 404a . . . *n* (e.g., via PC5 RRC). At 444, the gNB 120A configures the assisting UEs 404a . . . *n* with SL-PRS resources in a similar manner as in 405 discussed above. At 446, one or more of the assisting UEs 404a . . . *n* configure the UE 110 with the SL-PRS resources (or resource sets). At 448, the UE 110 reports its RS reception capability to the assisting UEs 404a . . . *n* in a manner similar to 410 discussed above.

At 450, one or more of the assisting UEs 404a . . . *n* transmit the SL-PRS to the UE 110. In some embodiments, an assisting UE 404a . . . *n* may activate one (or some) of the SL-PRS resources randomly. In some embodiments, an assisting UE 404a . . . *n* may alternatively activate one (or some) of the SL-PRS resources based on an SL-SSID of the assisting UE 404a . . . *n* or based on some trigger or request received from the UE 110. In some embodiments, the SL-PRS transmission at 450 may include various details about the assisting UEs 404a . . . *n* such as, for example, the UE ID corresponding to each of the assisting UEs 404a . . . *n* associated with each SL-PRS, the SL-PRS configuration of the specific assisting UE 404a . . . *n* (e.g., starting PRB, comb size, slots and symbol offset, number of symbols, periodicity, number of repetitions, etc.), spatial direction information (e.g. azimuth, elevation, etc.) of the SL-PRS resources configured for this assisting UE 404a . . . *n*, the SL-SSB information of this assisting UE 404a . . . n, and geographical coordinates (absolute or relative to the gNB 120A or reference assisting UE) of the assisting UEs 404a . . . n.

At 454, the UE 110 determines its location based on the measurement of the SL-PRS parameters received from the assisting UEs 404a . . . n.

Figure 4D:
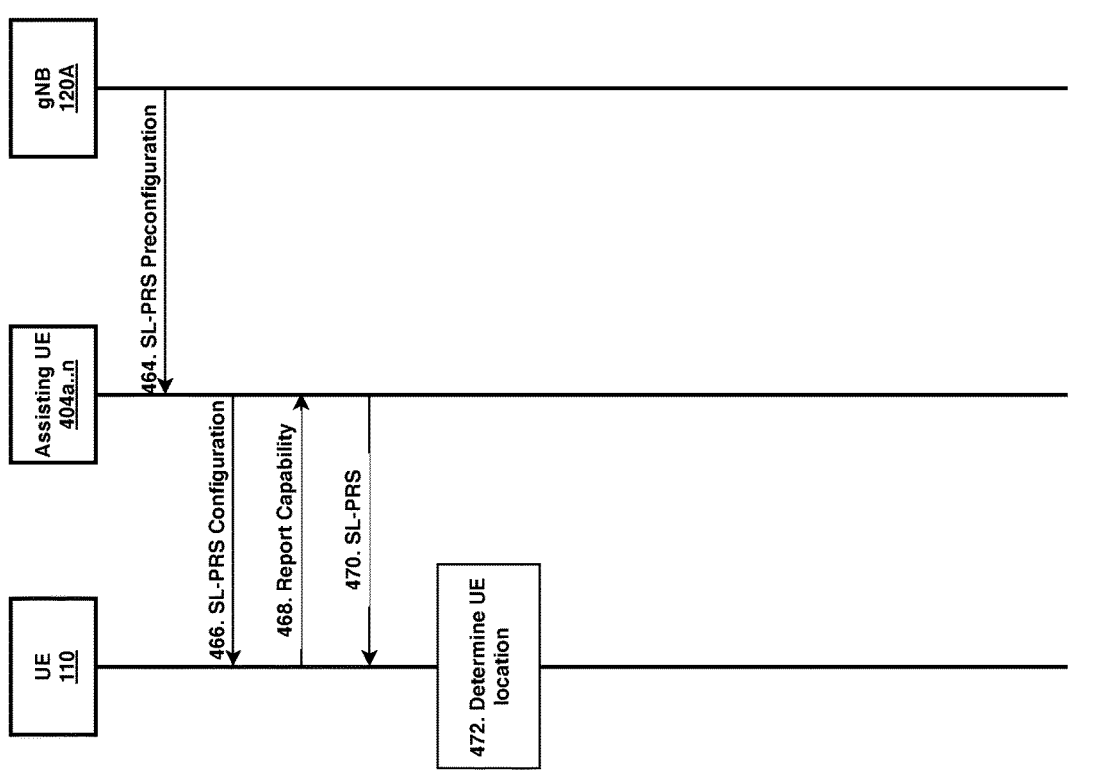

FIG. 4D depicts a signaling diagram 460 for a scenario in which both the UE 110 and the one or more assisting UEs 404a . . . n are outside of network coverage. In such a scenario, the UE 110 and the assisting UEs 404a . . . n may have been preconfigured with the SL-PRS resources when they were within network coverage. Alternatively, the assisting UEs 404a . . . n may have been preconfigured with the SL-PRS resources by the gNB 120A at 464 and then may indicate this SL-PRS resource preconfiguration to the UE 110 at 466 (e.g., via PC5 RRC).

At 468, the UE 110 reports its RS reception capability to the assisting UEs 404a . . . n in a manner similar to 410 discussed above. At 470, one or more of the assisting UEs 404a . . . n transmit a SL-PRS to the UE 110 in a manner similar to 432 discussed above. At 472, the UE 110 determines its location based on the measurement of the SL-PRS parameters received from the assisting UEs 404a . . . n.

In some embodiments, the SL-PRS transmission at 470 (as well as at 450) may be in response to a trigger or request by the UE 110 for the SL-PRS. In such an embodiment, the request may be transmitted to the assisting UE 404a . . . n via a MAC-CE on a PSSCH or as part of an enhanced feedback provided on a physical sidelink feedback channel (PSFCH). In some embodiments, the request may be UE specific (specific to one of the assisting UEs 404a . . . n). In some embodiments, the request may alternatively be a groupcast/broadcast message indicating which one(s) of the assisting UEs 404a . . . n is requested to transmit the SL-PRS. In some embodiments, the UE 110 may further specify desired parameters in the request. For example, the UE 110 may indicate whether the assisting UE should be stationary, meet a predefined mobility threshold, meet a positioning signal strength threshold, etc. In response, the assisting UEs 404a . . . n may transmit a basic safety message (BSM) that includes resource elements (REs) such as, for example, a message ID, temporary ID, a time stamp, a latitude, a longitude, an elevation, positional accuracy, speed, acceleration, etc. Based on one or more of the values of these REs, the UE 110 may select one or more of the Assisting UEs 404a . . . n for which to request the SL-PRS transmission. Based on the values of the REs in the BSM and the reference signal received from the one or more assisting UEs 404a . . . n, the UE 110 determines its location.

In the above descriptions, the UE 110 may indicate that positioning assistance is required by communicating this request for assistance with the LMF 132, communicates that assistance request with the gNB 120A, which configures the assisting UEs 404a . . . n. This assumes that the UE 110 and the assisting UEs 404a . . . n are all within network coverage. In some embodiments, the UE 110 may alternatively communicate its request directly with the gNB 120A, which configures the assisting UEs 404a . . . n. In some embodiments, the UE 110 may alternatively communicate its request with the LMF 132, which directly configures the assisting UEs 404a . . . n. In some embodiments, if the UE 110 is not within network coverage, the UE 110 may alternatively communicate its request directly to the assisting UEs 404a . . . n. In some embodiments, the initiation of the SL-PRS configuration and transmission may be independent of any indication provided by the UE 110. That is, the SL-PRS configuration and transmission may be initiated by the LMF 132.

Figure 5A:
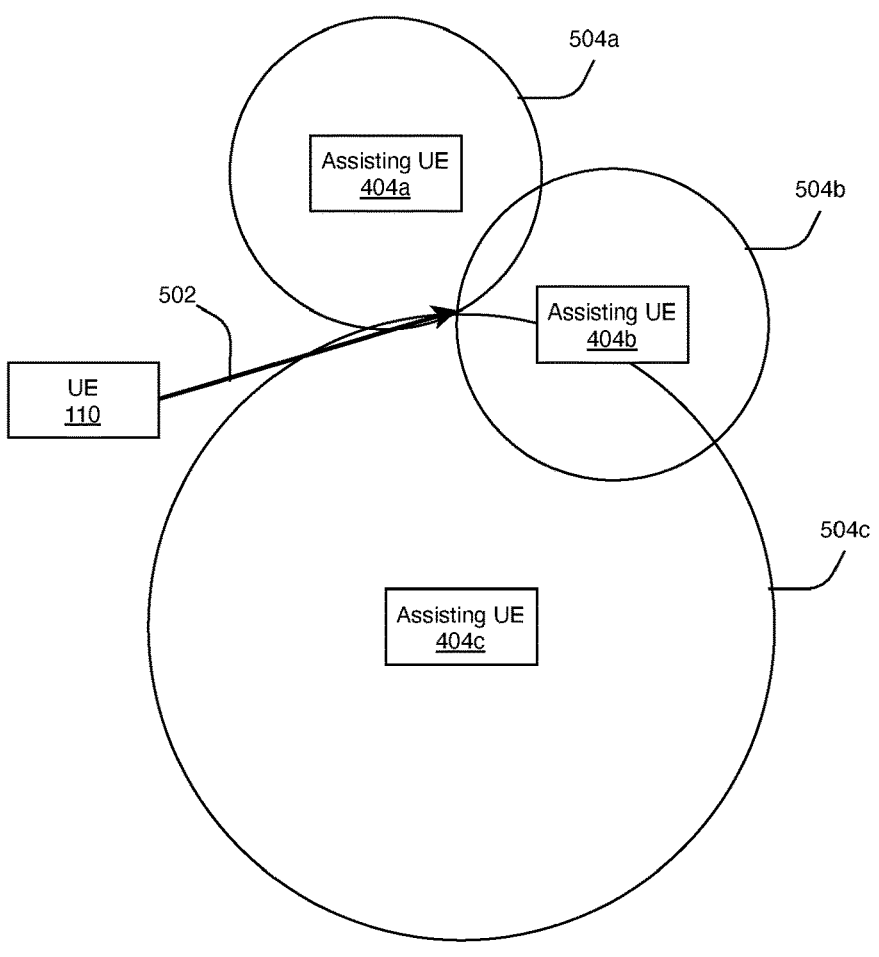
FIG. 5A shows an exemplary scenario in which a UE determines its position based on the positions of nearby assisting UEs according to various exemplary embodiments.

FIG. 5A shows an exemplary scenario in which the UE 110 determines its position based on the positions of nearby assisting UEs 404a-c according to various exemplary embodiments. FIG. 5A assumes that the coordinates of the UE 110 are unknown while the coordinates of each of the assisting UEs 404a-c are known. Based on the known coordinates of the assisting UEs 404a-c, the UE 110 can determine its location by calculating a distance 502 from the UE 110 to an intersection of circles 504a-c corresponding to the assisting UEs 404a-c. Based on this distance 502 and a round trip time (RTT) of a transmission between the UE 110 and each of the assisting UEs 404a-c (described below with respect to FIG. 5B), the UE 110 may determine its location.

Figure 5B:
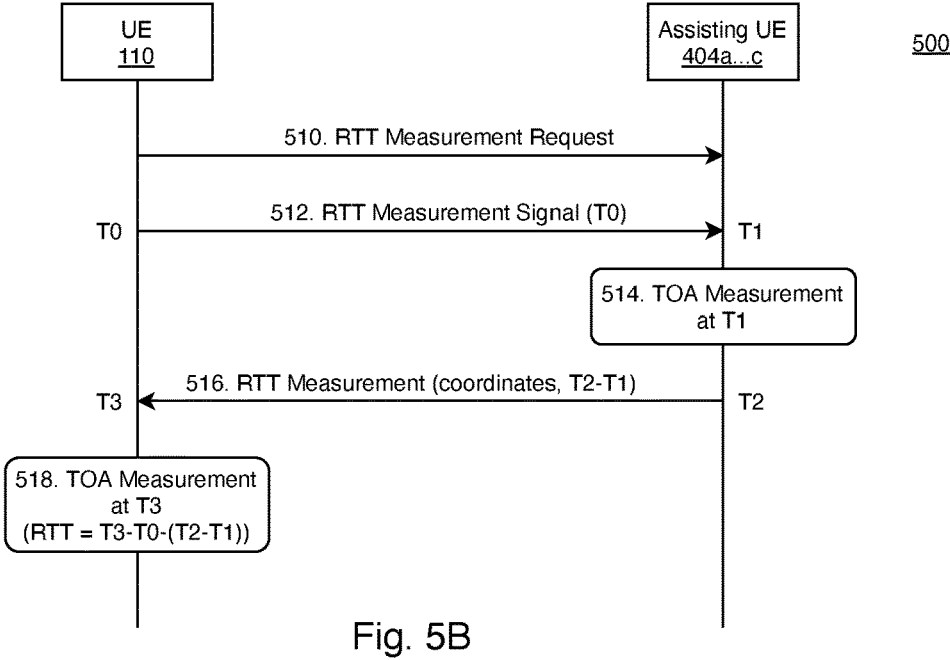
FIG. 5B shows an exemplary signaling diagram illustrating a method of determining a UE's position based on the positions of nearby assisting UEs according to various exemplary embodiments.

FIG. 5B shows an exemplary signaling diagram 500 illustrating determining a UE's position based on the positions of nearby assisting UEs according to various exemplary embodiments. At 510, the UE 110 transmits an RTT measurement request to one of the assisting UEs 404a-c. At 512, the UE 110 transmits an RTT measurement signal at time T0 to the assisting UE. At 514, the assisting UE performs the time of arrival (TOA) measurement at T1. At 516, the assisting UE transmits the RTT measurement along with its coordinates at T2. At 518, the UE 110 performs a TOA measurement at T3. The RTT is determined based on T3−T0−(T2−T1). The UE 110 repeats the method for each of the assisting UEs 404a-c to determine its location.

In other exemplary embodiments, the distance between the assisting UEs 404a-c and the UE 110 may be determined based on angle of arrival (AOA) and/or angle of departure (AOD) based positioning methods. Those skilled in the art will understand that these positioning methods are generally based on a transmission and/or reception beam sweeping to determine the distance between two devices.

EXAMPLES

In a first example, a processor of a user equipment (UE) is configured to perform operations comprising receiving a sidelink (SL) positioning reference signal (PRS) resource configuration, wherein the SL-PRS resource configuration indicates one or more SL-PRS resources configured for one or more assisting UEs in a vicinity of the UE, transmitting a reference signal (RS) positioning capability and measuring SL-PRS transmitted from the one or more assisting UEs.

In a second example, the processor of the first example, wherein, based on the UE being within a coverage area of a network, the SL-PRS resource configuration is received as part of location assistance data from a location management function (LMF) of a fifth-generation core network (5GC) or positioning system information block (posSIB).

In a third example, the processor of the second example 8, wherein the SL-PRS resource configuration includes one or more of a UE identification (ID) corresponding to each of the one or more assisting UEs associated with each SL-PRS, a timing relative to a first PRS received from a base station of the network and a second PRS received from the one or more assisting UEs, the SL-PRS configuration of specific ones of the one or more assisting UEs, spatial direction information of the one or more SL-PRS resources config-ured for the assisting UEs, SL-synchronization signal block (SSB) information corresponding to the one or more assisting UEs, and geographical coordinates of the one or more assisting UEs.

In a fourth example, the processor of the first example, wherein, based on the UE being within a coverage area of a network, the SL-PRS resource configuration is received from a base station of the network, wherein the SL-PRS resource configuration is one of a UE specific configuration or a cell specific configuration.

In a fifth example, the processor of the fourth example, wherein the SL-PRS resource configuration includes one or more of a UE identification (ID) corresponding to each of the one or more assisting UEs associated with each SL-PRS, a timing relative to a first PRS received from a base station of the network and a second PRS received from the one or more assisting UEs, the SL-PRS configuration of specific ones of the one or more assisting UEs, spatial direction information of the one or more SL-PRS resources configured for the assisting UEs, SL-synchronization signal block (SSB) information corresponding to the one or more assisting UEs, and geographical coordinates of the one or more assisting UEs.

In a sixth example, the processor of the first example, wherein, based on the UE being outside of a coverage area of a network, the UE receives the SL-PRS resource configuration prior to moving outside the coverage area of the network.

In a seventh example, the processor of the sixth example, wherein the SL-PRS resource configuration includes one or more of (i) a UE identification (ID) corresponding to each of the one or more assisting UEs associated with each SL-PRS, (ii) a timing relative to a first PRS received from a base station of the network and a second PRS received from the one or more assisting UEs, (iii) the SL-PRS configuration of specific ones of the one or more assisting UEs, (iv) spatial direction information of the one or more SL-PRS resources configured for the assisting UEs, (v) SL-synchronization signal block (SSB) information corresponding to the one or more assisting UEs, and (vi) geographical coordinates of the one or more assisting UEs.

In an eighth example, the processor of the first example, wherein, based on the UE being outside of a coverage area of a network, the UE receives the SL-PRS resource configuration from one of the one or more assisting UEs.

In a ninth example, the processor of the eighth example, wherein the SL-PRS resource configuration includes one or more of (i) a UE identification (ID) corresponding to each of the one or more assisting UEs associated with each SL-PRS, (ii) the SL-PRS configuration of specific ones of the one or more assisting UEs, (iii) spatial direction information of the one or more SL-PRS resources configured for the assisting UEs, (iv) SL-synchronization signal block (SSB) information corresponding to the one or more assisting UEs, and (v) geographical coordinates of the one or more assisting UEs.

In a tenth example, the processor of the first example, wherein the operations further comprise transmitting a request that the one or more assisting UEs transmit the SL-PRS to the UE.

In an eleventh sixth example, the processor of the tenth example, wherein the request is transmitted as one of (a) a part of a medium access control (MAC) control-element (CE) on a PSSCH, or (b) feedback provided on a physical sidelink feedback channel (PSSCH).

In a twelfth sixth example, the processor of the tenth example, wherein the request is specific to specific ones of the one or more assisting UEs.

In a thirteenth example, the processor of the tenth example, wherein the request is transmitted as a groupcast or broadcast message to the one or more assisting UEs and indicates which one or ones of the one or more assisting UEs is requested to transmit the SL-PRS.

In a fourteenth example, the processor of the tenth example, wherein the request includes an identification of one of the one or more assisting UEs based on a SL-Service Set Identifier (SL-SSID).

In a fifteenth example, the processor of the first example, wherein the SL-PRS comprises positioning sounding reference signals (Pos-SRS), wherein the UE receives downlink PRS (DL-PRS) from a base station and the Pos-SRS from the one or more assisting UEs in a time division multiplexing (TDM) manner.

In a sixteenth example, the processor of the first example, wherein the SL-PRS comprises downlink PRS (DL-PRS), wherein the UE receives DL-PRS from both a base station and the one or more assisting UEs in a same DL slot and symbols.

In a seventeenth example, the processor of the first example, wherein the operations further comprise transmitting an indication that the UE is using a location assisted procedure.

In an eighteenth example, the processor of the seventeenth example, wherein the indication is transmitted to one of a base station, a location management function (LMF) or the one or more assisting UEs.

In a nineteenth example, the processor of the first example, wherein the operations further comprise calculating a position of the UE based on the measured SL-PRS.

In a twentieth example, the processor of the nineteenth example, wherein the calculating the position is based on known coordinates of at least three of the one or more assisting UEs.

In a twenty first example, the processor of the nineteenth example, wherein the calculating the position is based on a distance between the UE and at least one of the one or more assisting UEs.

In a twenty second example, the processor of the twenty first example, wherein the distance between the UE and the at least one of the one or more assisting UEs is determined using one of a round trip time (RTT) calculation, and angle of arrival (AOA) calculation or an angle of departure (AOD) calculation.

In a twenty third example, a processor of a location assisting user equipment (UE) is configured to perform operations comprising receiving a sidelink (SL) positioning reference signal (PRS) resource configuration, wherein the SL-PRS resource configuration indicates SL-PRS resources to be transmitted via a sidelink to a location assisted UE in a vicinity of the location assisting UE and transmitting SL-PRS to the location assisted UE based on the SL-PRS resource configuration.

In a twenty fourth example, the processor of the twenty third example, wherein the receiving is performed while the location assisting UE is within a coverage area of a network, and wherein, based on the location assisting UE being outside of a coverage area of the network, the location assisting UE uses the SL-PRS resource configuration received when the location assisting UE was within the coverage area of the network.

In a twenty fifth example, the processor of the twenty fourth example, wherein, based on the location assisting UE being outside of the coverage area of the network, the location assisting UE activates one or more of the SL-PRS resources randomly.

In a twenty sixth example, the processor of the twenty fourth example, wherein, based on the location assisting UE being outside of the coverage area of the network, the location assisting UE activates one of the SL-PRS resources based on a UE ID included in the SL-PRS resource configuration.

In a twenty seventh example, the processor of the twenty fourth example, wherein, based on the location assisting UE being outside of the coverage area of the network, the location assisting UE activates one of the SL-PRS resources in response to a request from the location assisted UE.

In a twenty eighth example, the processor of the twenty third example, further comprising transmitting the SL-PRS resource configuration to the location assisted UE when the location assisted UE is outside of a coverage area of a network.

In a twenty ninth example, the processor of the twenty eighth example, wherein the SL-PRS resource configuration includes one or more of (i) a UE identification (ID) corresponding to the location assisting UE, (ii) the SL-PRS configuration corresponding to the location assisting UE, (iii) spatial direction information of the one or more SL-PRS resources configured for the location assisting UE, (iv) SL-synchronization signal block (SSB) information corresponding to the location assisting UE, and (v) geographical coordinates of the location assisting UE.

In a thirtieth example, the processor of the twenty third example, wherein the operations further comprise receiving, from the location assisted UE, a request to transmit the SL-PRS.

In a thirty first example, the processor of the thirtieth example, wherein the request is received as one of (a) a part of a medium access control (MAC) control-element (CE) on a PSSCH, or (b) feedback provided on a physical sidelink feedback channel (PSSCH).

In a thirty second example, the processor of the thirtieth example, wherein the request is specific to the location assisting UE.

In a thirty third example, the processor of the thirtieth example, wherein the request is part of a groupcast or broadcast message indicating which one or ones of one or more location assisting UEs is requested to transmit the SL-PRS.

In a thirty fourth example, the processor of the thirtieth example, wherein the request includes an identification of the location assisting UE based on a SL-Service Set Identifier (SL-SSID).

In a thirty fifth example, the processor of the twenty third example, further comprising receiving, from the location assisted UE, a reference signal (RS) positioning capability.

In a thirty sixth example, the processor of the twenty third example, further comprising transmitting coordinate information and at least one reference signal via a basic safety message (BSM) to indicate the location assisting UE is available for location assistance.

In a thirty seventh example, a processor of a base station is configured to perform operations comprising determining one or more assisting user equipments (UEs) that are proximate to a positioning UE and configuring the one or more assisting UEs with one or more sidelink (SL)-positioning reference signal (PRS) resources for transmission to the positioning UE, wherein the one or more SL-PRS resources are used to determine a location of the positioning UE.

In a thirty eighth example, the processor of the thirty seventh example, wherein the one or more SL-PRS resources are configured on a same positioning frequency layer (PFL) as a downlink (DL)-PRS and share a same subcarrier spacing (SCS), cyclic prefix (CP), and DL-PRS-PointA as DL-PRS resources.

In a thirty ninth example, the processor of the thirty seventh example, wherein the one or more SL-PRS resources are configured on a same PFL as a DL-PRS and share a same DL-PRS-PointA, wherein the one or more SL-PRS resources have a first SCS and a first CP, and wherein DL-PRS resources have a second SCS and a second CP different than the first SCS and the first CP.

In a fortieth example, the processor of the thirty seventh example, wherein the one or more SL-PRS resources are configured on a different PFL than a DL-PRS.

In a forty first example, the processor of the thirty seventh example, wherein the SL-PRS is configured to be spatially related to an SL-synchronization signal block (SSB), an SL physical sidelink control channel (PSCCH), an SL-channel state information (CSI)-reference signal (RS), or an SL physical sidelink shared channel (PSSCH) of the one or more assisting UEs.

In a forty second example, the processor of the thirty seventh example, wherein the SL-PRS is configured to be spatially related to a DL-PRS, a DL-SSB, or a DL-CSI-RS received by the one or more assisting UEs or to a sounding reference signal (SRS) transmitted by one or more assisting UEs.

In a forty third example, the processor of the thirty seventh example, wherein based on the one or more assisting UEs being within a coverage area of the base station, the one or more SL-PRS resources are configured via a radio resource control (RRC) configuration.

In a forty fourth example, the processor of the thirty seventh example, wherein the one or more SL-PRS resources include multiple SL-PRS resources, and wherein the operations further comprise transmitting a medium access control (MAC)-control element (CE) or a downlink control information (DCI) to the one or more assisting UEs to indicate which one of the multiple SL-PRS resources should be activated, wherein the MAC-CE or DCI further indicates a duration during which the one of the multiple SL-PRS resources should be activated.

In a forty fifth example, the processor of the thirty seventh example, wherein based on the one or more assisting UEs being outside of a coverage area of the base station, the one or more assisting UEs are preconfigured with the one or more SL-PRS resources, and wherein an SL-PRS preconfiguration includes a plurality of SL-PRS parameters.

In a forty sixth example, the processor of the forty fifth example, wherein one of the plurality of SL-PRS parameters includes an assisting UE ID to indicate one of the one or more assisting UEs is to activate one of the SL-PRS resources.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. An apparatus comprising processing circuitry coupled to a memory, wherein the processing circuitry is configured to perform operations comprising:

receive a sidelink (SL) positioning reference signal (PRS) configuration information, wherein the SL-PRS configuration information is associated with one or more SL-PRS resources configured for one or more assisting user equipments (UEs) in a vicinity of a location assisted UE, wherein the SL-PRS resource configuration information is received as part of assistance data from a location management function (LMF) of a fifth-generation core network (5GC), wherein the assistance data further comprises an azimuth parameter and an elevation parameter associated with the SL-PRS resources for the one or more assisting UEs;

generate, for transmission, a reference signal (RS) reception capability, wherein the RS reception capability includes parameters for a Uu interface and a PC5 interface; and measure SL-PRS transmitted from the one or more assisting UEs.

2. The apparatus of claim 1, wherein the one or more SL-PRS resources are configured on a same positioning frequency layer (PFL) as a downlink (DL)-PRS and share a same subcarrier spacing (SCS), cyclic prefix (CP), and DL-PRS-PointA as DL-PRS resources.

3. The apparatus of claim 1, wherein the one or more SL-PRS resources are configured on a same PFL as a DL-PRS and share a same DL-PRS-PointA, wherein the one or more SL-PRS resources have a first SCS and a first CP, and wherein DL-PRS resources have a second SCS and a second CP different than the first SCS and the first CP.

4. The apparatus of claim 1, wherein the one or more SL-PRS resources are configured on a different PFL than a DL-PRS.

5. The apparatus of claim 1, wherein the SL-PRS is configured to be spatially related to an SL-synchronization signal block (SSB), an SL physical sidelink control channel (PSCCH), an SL-channel state information (CSI)-reference signal (RS), or an SL physical sidelink shared channel (PSSCH) of the one or more assisting UEs or the UE.

6. The apparatus of claim 1, wherein the SL-PRS is configured to be spatially related to a DL-PRS, a DL-SSB, or a DL-CSI-RS received by the one or more assisting UEs or to a sounding reference signal (SRS) transmitted by the one or more assisting UEs.

7. The apparatus of claim 1, further comprising:

sending a request to the one or more assisting UEs to activate one of the SL-PRS resources.

8. The apparatus of claim 1, wherein, based on the UE being within a coverage area of a network, the SL-PRS resource configuration is received from a base station of the network, wherein the SL-PRS resource configuration is one of a UE specific configuration or a cell specific configuration.

9. The apparatus of claim 1, wherein, based on the UE being outside of a coverage area of a network, the UE receives the SL-PRS resource configuration prior to moving outside the coverage area of the network.

10. The apparatus of claim 1, wherein, based on the UE being outside of a coverage area of a network, the UE receives the SL-PRS resource configuration from one of the one or more assisting UEs.

11. The apparatus of claim 1, wherein the operations further comprise:

transmitting a request that the one or more assisting UEs transmit the SL-PRS to the UE.

12. The apparatus of claim 1, wherein the RS reception capability is transmitted to the one or more assisting UEs or a base station.

13. An apparatus comprising processing circuitry coupled to a memory, wherein the processing circuitry is configured to perform operations comprising:

receive a sidelink (SL) positioning reference signal (PRS) configuration information, wherein the SL-PRS configuration information is associated with SL-PRS resources to be transmitted via a sidelink to a location assisted user equipment (UE) in a vicinity of a location assisting UE, wherein the SL-PRS configuration information is received as part of assistance data from a location management function (LMF) of a fifth-generation core network (5GC), wherein the assistance data further comprises an azimuth parameter and an elevation parameter associated with the SL-PRS resources for the location assisting UEs, and wherein the location assisted UE generates a reference signal (RS) reception capability which includes parameters for a Uu interface and a PC5 interface; and generate, for transmission, SL-PRS to the location assisted UE based on the SL-PRS resource configuration.

14. The apparatus of claim 13, wherein, based on the location assisting UE being within a coverage area of a network, the SL-PRS resource configuration is received via one of a radio resource control (RRC) message or a positioning system information block (PosSIB).

15. The apparatus of claim 13, wherein, based on the location assisting UE being within a coverage area of a network and the SL-PRS resource configuration comprises multiple SL-PRS resources, the operations further comprise:

receiving a medium access control-control element (MAC-CE) or downlink control information (DCI) to indicate which one of the multiple SL-PRS resources is to be activated, wherein the MAC-CE or DCI further indicates a duration during which the one of the multiple SL-PRS resources is to be activated.

16. The apparatus of claim 13, wherein the receiving is performed while the location assisting UE is within a coverage area of a network, and wherein, based on the location assisting UE being outside of the coverage area of the network, the location assisting UE uses the SL-PRS resource configuration received when the location assisting UE was within the coverage area of the network.

17. The apparatus of claim 13, further comprising:

transmitting the SL-PRS resource configuration to the location assisted UE when the location assisted UE is outside of a coverage area of a network.

18. The apparatus of claim 13, wherein the operations further comprise:

receiving, from the location assisted UE, a request to transmit the SL-PRS.

19. A non-transitory computer readable storage medium comprising a set of instructions, wherein the set of instructions when executed by a processor cause the processor of a user equipment (UE) to perform operations, comprising:

receive a sidelink (SL) positioning reference signal (PRS) configuration information, wherein the SL-PRS configuration information is associated with one or more SL-PRS resources configured for one or more assisting user equipments (UEs) in a vicinity of a location assisted UE, wherein the SL-PRS resource configuration information is received as part of assistance data from a location management function (LMF) of a fifth-generation core network (5GC), wherein the assistance data further comprises an azimuth parameter and an elevation parameter associated with the SL-PRS resources for the one or more assisting UEs;

generate, for transmission, a reference signal (RS) reception capability, wherein the RS reception capability includes parameters for a Uu interface and a PC5 interface; and measure SL-PRS transmitted from the one or more assisting UEs.

\* \* \* \* \*